(12) United States Patent
Zhou

(10) Patent No.: US 8,137,041 B2
(45) Date of Patent: Mar. 20, 2012

(54) VIBRATION-ISOLATING FASTENING ASSEMBLY

(75) Inventor: Yong Heng Zhou, Guang Dong (CN)

(73) Assignee: 3M Innovative Properties Company, St. Paul, MN (US)

( * ) Notice: Subject to any disclaimer, the term of this patent is extended or adjusted under 35 U.S.C. 154(b) by 423 days.

(21) Appl. No.: 12/535,727

(22) Filed: Aug. 5, 2009

(65) Prior Publication Data
US 2011/0033259 A1    Feb. 10, 2011

(51) Int. Cl.
F16B 35/04    (2006.01)
(52) U.S. Cl. .................. 411/353; 411/903; 411/999
(58) Field of Classification Search .................. 411/353, 411/542, 903, 970, 999
See application file for complete search history.

(56) References Cited

U.S. PATENT DOCUMENTS

| | | | |
|---|---|---|---|
| 3,128,999 A | 4/1964 | Schmitt | |
| 3,272,952 A * | 9/1966 | McKeon | 200/293 |
| 3,675,881 A | 7/1972 | Caldwell | |
| 4,363,580 A | 12/1982 | Bell | |
| 4,521,004 A | 6/1985 | Caldwell | |
| 4,732,519 A | 3/1988 | Wagner | |
| 4,907,927 A * | 3/1990 | Choiniere | 411/368 |
| 4,924,533 A * | 5/1990 | Stairs, Jr. | 4/252.1 |
| 5,020,951 A * | 6/1991 | Smith | 411/107 |
| 5,094,579 A * | 3/1992 | Johnson | 411/107 |
| 5,397,206 A | 3/1995 | Sihon | |
| 5,462,395 A * | 10/1995 | Damm et al. | 411/107 |
| 5,765,819 A | 6/1998 | Hummel | |
| 5,871,319 A * | 2/1999 | Schneider | 411/107 |
| 5,873,429 A | 2/1999 | Qutub | |
| 5,876,023 A | 3/1999 | Hain et al. | |
| 6,029,942 A | 2/2000 | Daddis, Jr. et al. | |
| 6,227,784 B1 | 5/2001 | Antoine et al. | |
| 6,238,127 B1 | 5/2001 | Jhumra et al. | |
| 6,394,724 B1 * | 5/2002 | Kelly et al. | 411/353 |
| 6,395,986 B1 | 5/2002 | Gust et al. | |
| 6,591,801 B1 | 7/2003 | Fonville | |
| 2006/0029486 A1 | 2/2006 | Fonville | |

FOREIGN PATENT DOCUMENTS

| | | |
|---|---|---|
| EP | 1 205 672 A1 | 5/2002 |
| JP | 05-086007 | 11/1993 |
| JP | 06-030511 | 4/1994 |
| JP | 06-058217 | 8/1994 |
| JP | 2008-261413 | 10/2008 |

OTHER PUBLICATIONS

Aero E-A-R Specialty Composites Product Guide, obtained from the web at html: http://www.earsc.com/pdfs/engineering/literature/GeneralCatalog/ProductGuide.pdf.
International Search Report, PCT/US2010/043960, Mar. 23, 2011, 3 Pages.

* cited by examiner

*Primary Examiner* — Flemming Saether
(74) *Attorney, Agent, or Firm* — Kenneth B. Wood

(57) ABSTRACT

Herein is disclosed a fastening assembly that may be used for securing first and second workpieces to each other in such manner as to provide vibration isolation between the first and second workpieces. The fastening assembly comprises an elongated, rigid fastener, and an elastomeric bushing, that are integrally secured together.

29 Claims, 6 Drawing Sheets

VIBRATION-ISOLATING FASTENING ASSEMBLY

BACKGROUND

Items that have moving parts (e.g., cooling fans and the like) are often attached to electronic equipment (e.g., computers, servers, projectors, and the like). Such items may cause undesired vibration, so it may be desired to attach such items to the electronic equipment in such manner as to minimize any vibration transmitted from the device to the electronic equipment.

SUMMARY

Herein is disclosed a fastening assembly that may be used for securing first and second workpieces to each other in such manner as to provide vibration isolation between the first and second workpieces. The fastening assembly comprises an elongated, rigid fastener, and an elastomeric bushing, that are integrally secured together.

Thus in one aspect, herein is disclosed a fastening assembly for securing together first and second workpieces while maintaining vibration-isolation between the workpieces, comprising: an axially elongated, rigid fastener comprising a radially enlarged head that comprises a flange extending radially outward therefrom and a shank extending axially therefrom, wherein at least a portion of the shank comprises a fastening means; an elastomeric bushing that circumferentially surrounds at least a portion of the elongated fastener and that has a cylindrical axis that is generally aligned with the long axis of the elongated fastener, the bushing comprising a radially enlarged head that at least partially encapsulates the flange of the fastener head so as to integrally secure the bushing and the fastener together; wherein the bushing includes at least two axially-extending, circumferentially-spaced, deflectable tabs, each tab comprising a tab head at a terminal end of the tab and a tab neck that is substantially radially thinner than the tab head and that is axially located between the tab head and the enlarged head of the bushing; and wherein by bending at the tab neck, each tab can be deflected at least from a first, axially extended position to a second, partially curled position in which the tab head is motivated axially toward the radially enlarged head of the bushing.

Thus in another aspect, herein is disclosed a method of securing first and second workpieces together in such a manner as to provide vibration isolation between the workpieces, the method comprising: providing first and second workpieces that are spaced apart from each other and that have aligned openings therein; providing a fastening assembly comprising: an axially elongated, rigid fastener comprising a radially enlarged head that comprises a flange extending radially outward therefrom and a shank extending axially therefrom, wherein at least a portion of the shank comprises a fastening means; an elastomeric bushing that circumferentially surrounds at least a portion of the elongated fastener and that has a cylindrical axis that is generally aligned with the long axis of the elongated fastener, the bushing comprising a radially enlarged head that at least partially encapsulates the flange of the fastener head so as to integrally secure the bushing and the fastener together; wherein the bushing includes at least two axially-extending, circumferentially-spaced, deflectable tabs, each tab comprising a tab head at a terminal end of the tab and a tab neck that is substantially radially thinner than the tab head and that is axially located between the tab head and the enlarged head of the bushing; passing at least the portion of the shank of the elongated fastener that comprises the fastening means, and at least the tab heads of the bushing, through an opening in the second workpiece; and, fastening the fastening means of the fastener shank to the first workpiece, thereby causing the two workpieces to be drawn nearer to each other and causing the terminal end of each bushing tab to contact a surface of the first workpiece adjacent the opening in the first workpiece thus causing each tab to bend at the tab neck causing each tab to be deflected from a first, axially extended position to a second, partially curled position in which the tab head is motivated axially toward the radially enlarged head of the bushing, and causing the second workpiece to be securely held between the tab heads of the bushing and the enlarged head of the bushing.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

FIG. 6b is a side cross sectional view of the elastomeric bushing of FIG. 6a, taken along line 6b-6b of FIG. 6a.

Like reference numbers in the various figures indicate like elements. Certain elements may be present in identical multiples; in such cases a only single representative element may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

Figure 1:
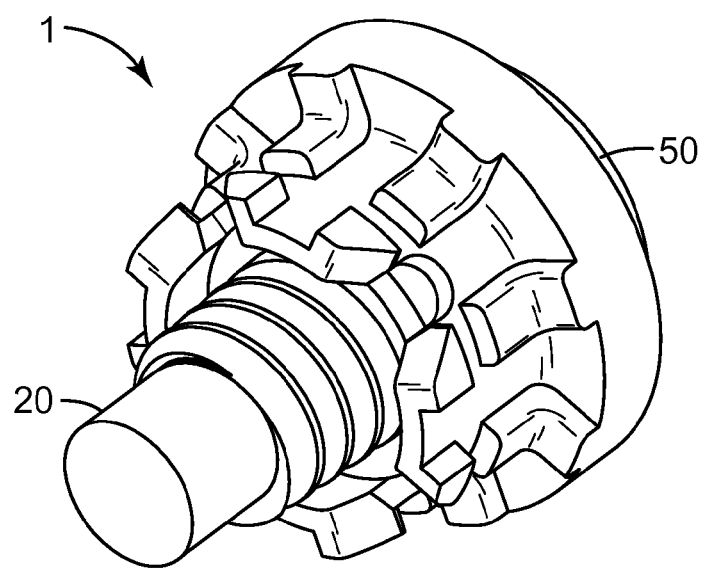
FIG. 1 is a perspective view of an exemplary fastening assembly disclosed herein.
Figure 2:
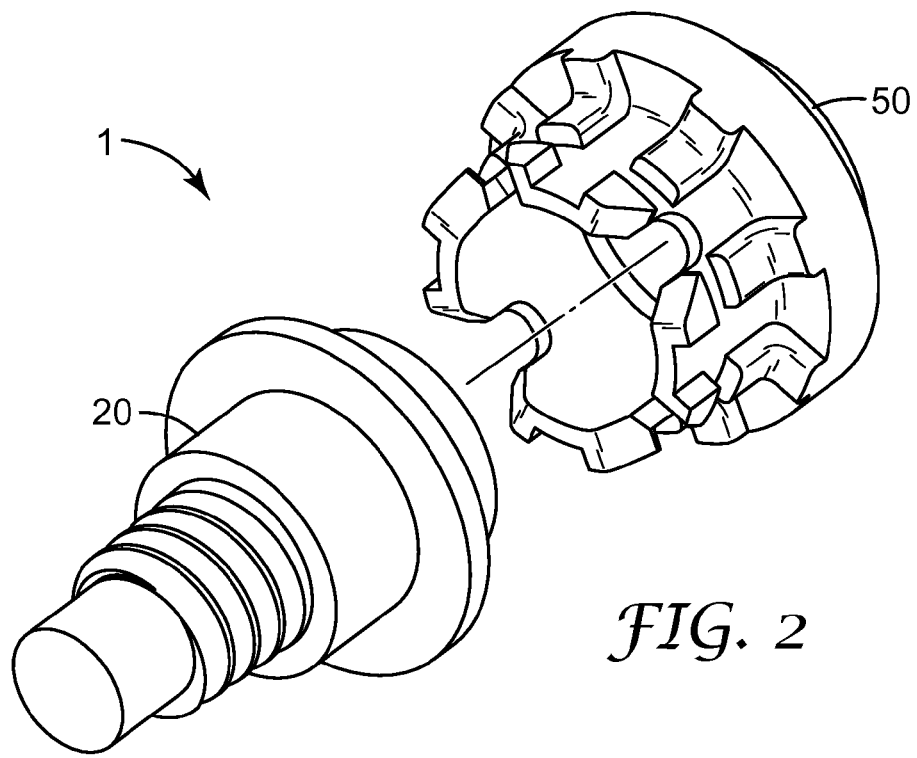
FIG. 2 is an exploded perspective view of the fastening assembly of FIG. 1.
Figure 3:
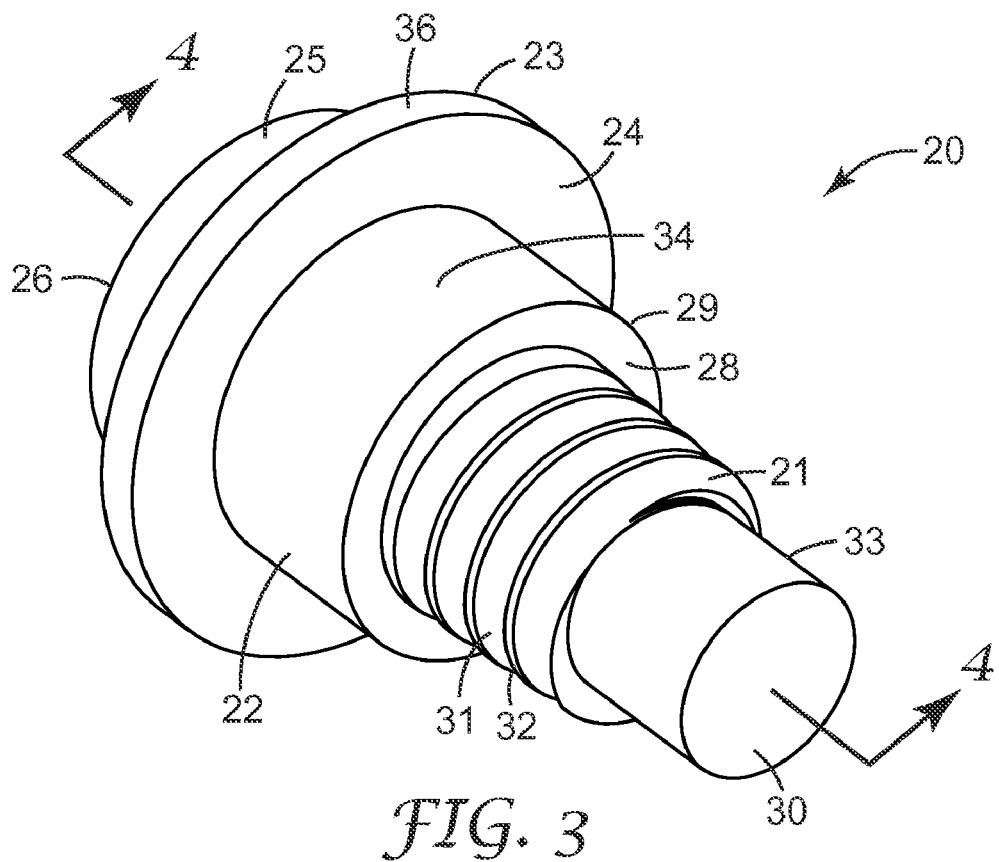
FIG. 3 is a perspective view of the bolt of the fastening assembly of FIG. 1.
Figure 4:
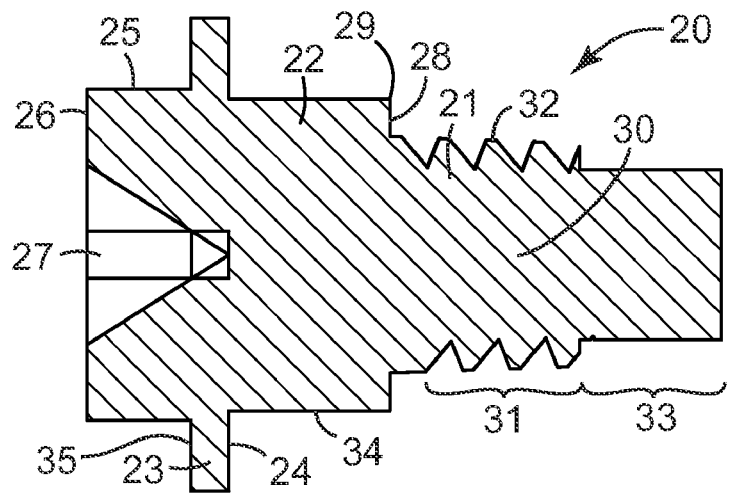
FIG. 4 is a side cross sectional view of the bolt of FIG. 3, taken along line 4-4 of FIG. 3.

FIGS. 1 and 2 show fastening assembly 1, which comprises fastener 20 and bushing 50, integrally secured together as disclosed herein. Fastener 20 is comprised of a rigid material (which, however, does not preclude a portion of fastener 20 being sufficiently deflectable so as to serve e.g. as a mushroom-head type fastening means). Fastener 20 may be made of metal (e.g., steel, aluminum, etc.), ceramic, rigid plastic, and the like. As can be seen in FIGS. 3 and 4, fastener 20 is axially elongated and comprises radially enlarged head 22 that comprises flange 23 extending radially outward therefrom. Fastener 20 further comprises shank 30 extending axially from head 22. At least a portion of shank 30 comprises a fastening means. In the exemplary embodiment shown in FIGS. 3 and 4, the fastening means comprises threaded portion 31 of shank 30 (comprising one or more individual threads 32 therein) that may be threadably engaged with and fastened to a workpiece. Instead of, or in addition to, threadable engagement, other fastening means may be employed, including e.g. a rivet, mushroom-head fastener, or other type of snap-fit fastener; an interference fit fastener; a bayonet connector; a hook or loop patch that may serve as part of a hook and loop fastening system; and the like. Instead of, or in addition to, such mechanical fastening means, fastener 20 may comprise an adhesive fastening means. This might comprise e.g. an adhesive on a surface of fastener 20 (by which fastener 20 may be adhesively attached to a workpiece); or, a surface of fastener 20 may be adapted to be bonded to an adhesive that is present on a workpiece.

As mentioned, radially enlarged head 22 of fastener 20 comprises at least one flange 23 extending generally radially outward therefrom. In the broadest terms, flange(s) 23 may take the form of any suitable projecting feature or features that extend generally radially outward from radially outer surface 34 of fastener head 22. Suitable flanges may comprise posts, studs, ribs, beams, hooks, and the like. Such flanges may extend generally perpendicularly from surface 34 of fastener head 22; or they may extend at any convenient (e.g., nonperpindicular) angle. All such flanges may comprise the same shape, radial thickness, and/or angle; or, a variety of differently shaped, sized, or angled projections may be used.

In particular embodiments of the type shown in FIGS. 3 and 4, flange 23 comprises a generally circumferentially continuous annular disc. In such embodiments, annular disc flange 23 may comprise first axially-facing surface 24 that faces generally toward shank 30, and second, oppositely axially-facing surface 35 that faces generally away from shank 30. In certain embodiments, flange 23 (whether disc-shaped or otherwise), may comprise discontinuities, openings, and the like. (Those of ordinary skill in the art will recognize that there may not be a firm dividing line between, e.g., one flange comprised of an annular disc with discontinuities therein, and multiple flanges each comprising an individual spoke.) In some embodiments, flange 23 may comprise multiple annular discs, helical threads, and the like.

Head 22 of fastener 20 may comprise axially-facing surface 28 (which may be present when the diameter of shank 30 is less than the diameter of radially enlarged head 22) from which shank 30 may extend axially. Fastener 20 may further comprise shoulder 29 at which surface 34 and surface 28 of fastener head 22 meet. Head 22 of fastener 20 may comprise portion 25 which extends axially beyond flange 23, in a direction opposite that from which shank 30 extends from head 22. The diameter of head portion 25 may be slightly different (e.g., larger) than that of the remaining portion of head 22 (e.g., as shown in FIG. 4). Head 22 of fastener 20 may comprise an open-ended cavity 27 (e.g., a slot, hex, or star-shaped bore) that is adapted to receive the terminal end of a screwdriver or drill bit, e.g. for rotating fastener 20 so as to threadably fasten it to a workpiece. Alternatively to or in addition to this, at least a portion (e.g. portion 25) of head 22 may be grippable by a gripping tool to perform such rotation. Although a cylindrical shape may allow such gripping (e.g., by pliers and the like), it may be advantageous in some cases to provide portion 25 of head 22 in a particular shape (e.g., a square or hex shape) so as to be easily gripped by a wrench and the like.

As shown in FIGS. 1 and 2, bushing 50 circumferentially surrounds at least a portion of fastener 20 and has a cylindrical axis that is generally aligned with the long axis of elongated fastener 20. Bushing 50 may be made of any elastomeric material that provides the desired flexibility and resiliency to allow tabs 55 of bushing 50 to deflect as described later herein. In particular embodiments, bushing 50 may be made by molding of a thermoplastic or thermosettable molding resin that is elastomeric when solidified. Suitable molding resins for bushing 50 may include natural rubber, synthetic polymeric materials such as e.g. isoprene rubber, butyl rubber, styrene-butadiene rubber, silicone rubber, nitrile rubber, polyurethane, plasticized PVC, and the like. In various embodiments, a suitable elastomeric molding material may comprise a Shore A hardness of less than about 77, less than about 67, or less than about 57. In further embodiments, a suitable elastomeric molding material may comprise a Shore A hardness of at least about 14, at least about 24, or at least about 34. Particularly suitable elastomeric molding materials may include those chosen to have relatively high vibration-damping properties (e.g., by way of having a relatively high loss modulus). Suitable materials may include e.g. those available from Aearo E-A-R division of 3M Company (St. Paul, Minn.) under the trade designations ISODAMP, VERSADAMP, AND ISOLOSS.

In various embodiments, bushing 50 may be made by a so-called overmolding or insert molding process, in which fastener 20 is inserted at least partially into a molding cavity and molding resin is injected into the cavity so as to circumferentially surround at least a portion of fastener 20 and is then solidified to form bushing 50. Radially inner surface 68 of bushing 50 may thus be in contact with (e.g., may radially overlie) a substantial portion of radially outer surface 34 of enlarged head 22 of fastener 20. Such contact may aid in integrally securing bushing 50 and fastener 20 together to form fastening assembly 1. In this context, to integrally secure means to secure bushing 50 and fastener 20 together such that they can be handled as a single unit, such that they cannot be separated from each other without the use of special tools and/or without damaging or destroying bushing 50 and/or fastener 20, and such that, if separated, they cannot be easily secured back together.

Figure 6A:
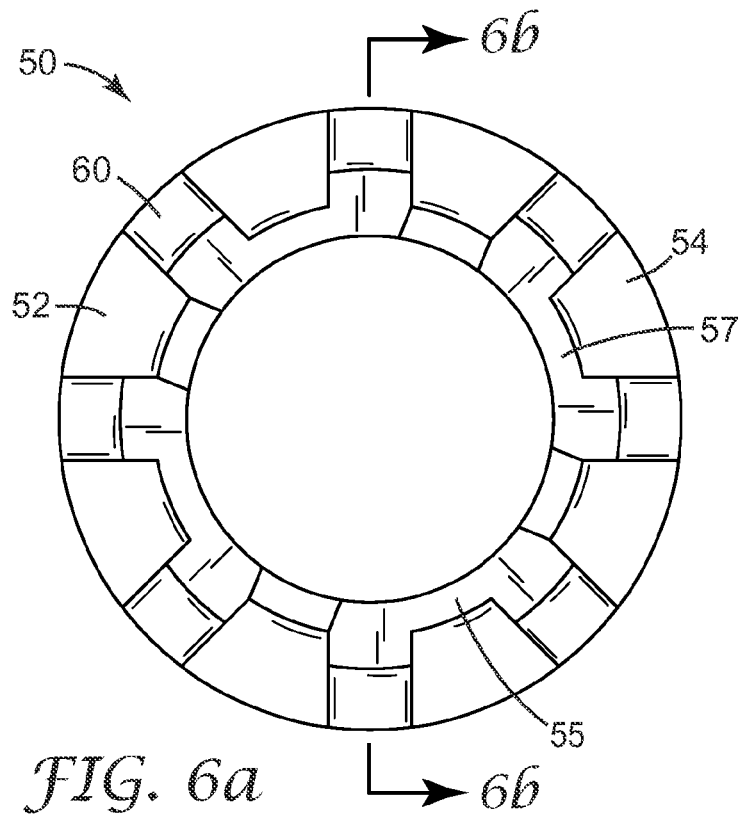
FIG. 6a is a top plan view of the elastomeric bushing of FIG. 5.
Figure 6B:
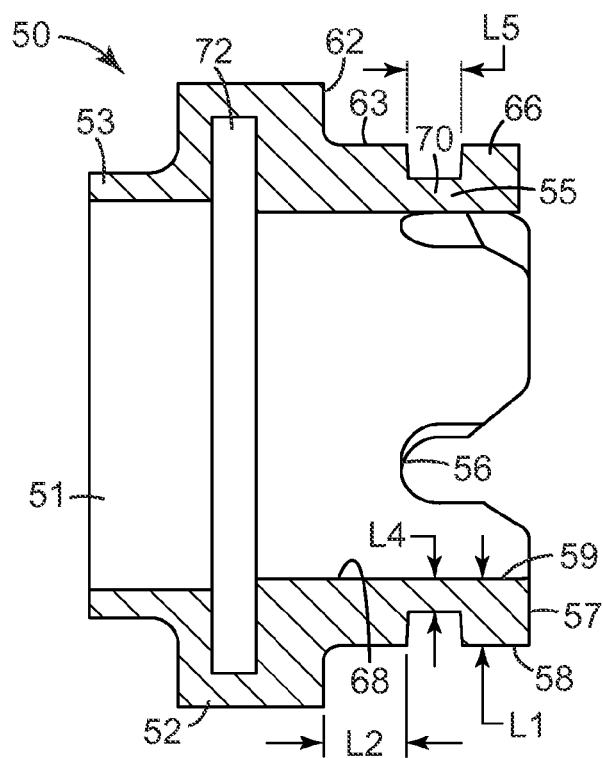
Figure 7:
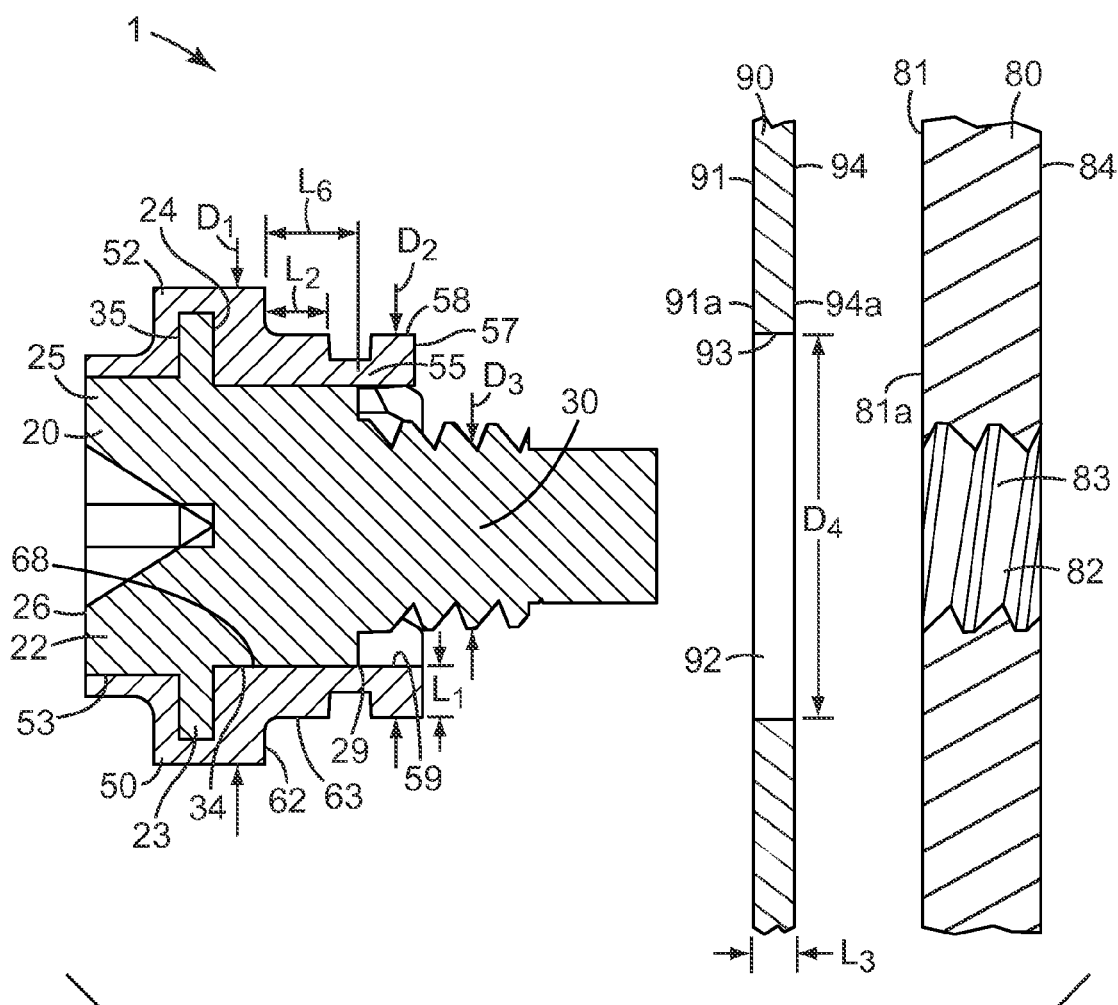
FIG. 7 is a side cross sectional view of the fastening assembly of FIG. 1, shown relative to first and second workpieces to be fastened together.

In accomplishing the integral securing of fastener 20 and bushing 50 to each other, flange 23 of fastener 20 may be particularly advantageous. That is, bushing 50 may be provided with a radially enlarged head 52 that at least partially encapsulates flange(s) 23 so as to securely integrally hold fastener 20 and bushing 50 together. In particular embodiments of the types shown in FIGS. 1-8, flange 23 may comprise a generally circumferentially continuous annular disc, with radially enlarged head 52 of bushing 50 comprising an annular, inwardly facing groove 72 within which disc flange 23 is held. In such embodiments, material of enlarged head 52 of bushing 50 will be in contact with at least a portion of first and second axially-facing surfaces 24 and 35, and radially outwardly-facing surface 36, of flange 23. In specific embodiments, all portions of first and second axially-facing surfaces 24 and 35, and radially outwardly-facing surface 36, of flange 23 will be in contact with material of enlarged head 52 of bushing 50 (e.g., as shown in FIG. 7).

As shown in further detail in FIGS. 5, 6a, 6b, and 7, bushing 50 may comprise a substantially hollow, and generally tubular, main body 51, comprising radially outer surface 64 and radially inner surface 68, and comprising radially enlarged head 52 as mentioned. Main body 51 of bushing 50 may comprise at least two tabs 55 that extend generally along the axial direction of bushing 50, away from bushing head 52. In further embodiments, busing 50 may comprise at least four such tabs 55. Tabs 55 are circumferentially spaced apart from each other by axially-oriented notches 56. Each tab 55 comprises tab head 66 which has a radial thickness L1 and tab neck 70 which has radial thickness L4 that is substantially radially thinner than radial thickness L1 of tab head 66. In this context, substantially radially thinner means that radial thickness L4 of tab neck 70 is no more than 70% of the radial thickness of tab head 66. In further embodiments, the radial thickness of tab neck 70 is less than about 60%, 50%, or 40% of the radial thickness of tab head 66.

Figure 5:
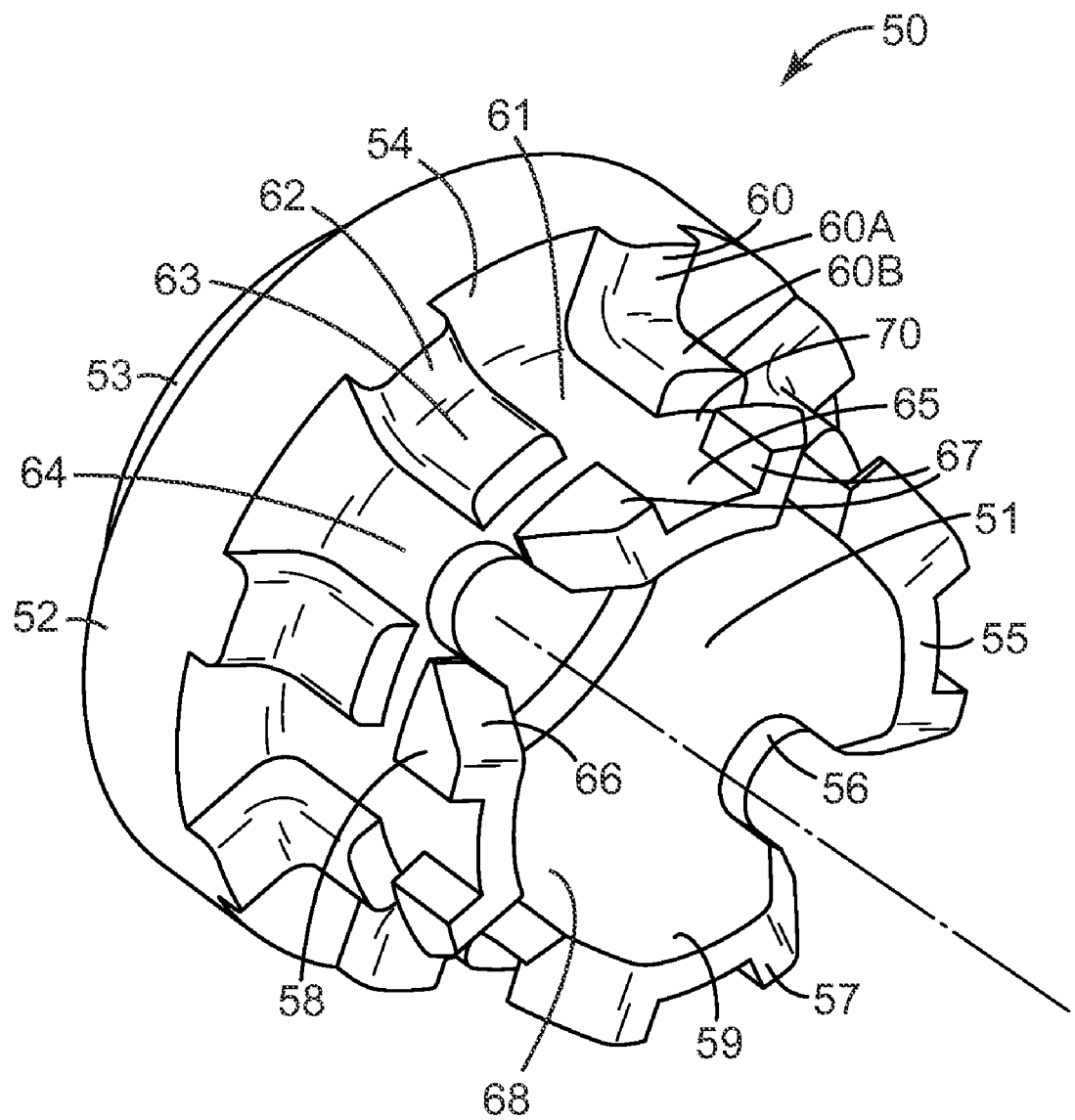
FIG. 5 is a perspective view of the elastomeric bushing of the fastening assembly of FIG. 1.

Each tab head 66 may comprise radially outward-facing surface 58, radially inward-facing surface 59, and axially-facing surface 57 (that defines the axially terminal end of tab 55 that is distal to bushing head 52). When viewed along the axial direction of bushing 50, tab heads 66 may take the form of an interrupted annulus (most easily seen in FIG. 6a) whose outer diameter D2 (as shown in FIG. 7) is defined by outer surfaces 58 of tab heads 66. As most easily seen in FIG. 5, in some embodiments tab head 66 may be divided (e.g. by axially oriented tab groove 65) into tab subheads 67 that are circumferentially joined to each other by a tab portion that is substantially radially thinner than the tab subheads (i.e., that has a radial thickness of no more than 70% of the radial thickness of the tab subheads). In such case, each tab subhead may have radially outward-facing surface 58, radially inward-facing surface 59, and axially-facing surface 57. Circumferential edges of tab heads 66 or of tab subheads 67 may be chamfered, rounded, etc. (e.g., as shown in FIG. 5), so that tab heads 66 are axially tapered. Tabs 55 and portions thereof, including tab heads 66, may be generally arcuate in shape (e.g., as shown in FIGS. 5 and 6a) when viewed along the cylindrical axis of bushing 50. Alternatively, individual tabs 55 and portions thereof may be relatively linear in shape, although they may still be circumferentially spaced so as to form an interrupted annulus in the general manner shown in FIG. 5.

The design of tab 55 (e.g., with relatively radially thick tab head 66 and relatively radially thin tab neck 70), in combination with the elastomeric material of which bushing 50 is made, may advantageously allow tab head 66 to be deflected radially outward (by bending of at least tab neck 70) when the axial terminal end of tab 55 (e.g., axially-facing surface 57 of tab 55) contacts a surface (e.g., of a workpiece), as discussed later herein.

Radially enlarged head 52 of bushing 50 may comprise axially-facing surface 54. In some embodiments, surface 54 may abut and/or contact a surface of a workpiece when fastening assembly 1 is used. In alternative embodiments, a plurality of resilient projections may protrude axially from bushing head 52, such that one or more of the resilient projections abut and/or contact a surface of a workpiece when fastening assembly 1 is used. Such projections may be made resilient e.g. by being formed of the same elastomeric material as is the rest of bushing 50 (e.g., with all components of bushing 50, including the projections, being formed as a single unit in a single molding operation)). Such resilient projections may advantageously provide bushing 50 with the capability to accommodate workpieces of various thicknesses, as described later.

In particular embodiments, the resilient projections of bushing head 52 may comprise axially protruding, radially extending, circumferentially spaced ribs 60, as shown in FIG. 5. Main body 51 of bushing 50 may also comprise ribs, e.g., radially protruding, axially extending, circumferentially spaced ribs. Such ribs may, as shown in the exemplary design of FIG. 5, be formed as continuations 60B of axially protruding, radially extending, circumferentially spaced ribs 60A.

In some embodiments, ribs 60B may be circumferentially aligned with tab heads 66. In other embodiments, ribs 60B may comprise substantially the same (i.e., within +/−10%) radial thickness as that of tab heads 66. In particular embodiments (as shown in FIG. 5), ribs 60B may be generally circumferentially aligned with tab subheads 67, and may comprise substantially the same radial thickness as that of tab subheads 67.

The positioning of bushing 50 upon fastener 20 is discussed in further detail with reference to FIGS. 6B and 7. As mentioned, bushing 50 circumferentially surrounds at least a portion of fastener 20, and has a radially enlarged head 52 that at least partially encapsulates flange 23 of fastener head 22. Bushing 50 may additionally comprise portion 53 that circumferentially surrounds portion 25 of fastener head 22, e.g. such that portion 53 of bushing 50 axially terminates at a point even with surface 26 of fastener head 22 (as shown in FIG. 7). In various embodiments, bushing 50 and fastener 20 may be designed such that shoulder 29 of fastener 20 is axially located within the axial extent of tab neck 70 of bushing 50 (as is shown in FIG. 7). In such embodiments tab heads 66 may extend axially so as to partially radially overlap threaded area 31 of fastener 20, again as shown in FIG. 7.

Fastening assembly 1 may be used to fasten first and second workpieces 80 and 90 together, in such a manner as to provide vibration isolation between the workpieces (i.e., such that a rigid connection or pathway between the workpieces is not present). As shown in FIG. 7, fastener 20 may be designed so that at least shank 30 of fastener 20, and tabs 55 of bushing 50, may pass through opening 92 of second workpiece 90 so that the fastening means of shank 30 of fastener 20 may be fastened to first workpiece 80. Specifically, the diameter D2 of the annulus defined by outer surfaces 58 of tab heads 66 may be chosen to be smaller than diameter D4 of opening 92 of workpiece 90, so that tab heads 66 of bushing 50 are able to pass through opening 92. (Although opening 92 in workpiece 90, and fastener 20 and bushing 50 in general, are described herein in generally circular terms, this description is for purpose of convenience and it is understood that other geometries may be used, in which case the term "diameter" should be understood as the dimension applicable to the particular geometry of workpiece opening and fastening assembly used).

Shank 30 of fastener 20, and tab heads 66 of bushing 50, may be passed through opening 92 of second workpiece 90 until surfaces 57 of tab heads 66 are brought into contact with surface 81 of first workpiece 80. (In the exemplary embodiment shown in FIG. 7, during this process shank 30 of fastener 20 may be passed at least partially into opening 82 of first workpiece 80. Accordingly, in such embodiments, largest diameter D3 of shank 30 of fastener 20 may be chosen so that the largest diameter portion 31 of shank 30 is able to fit into opening 82. (In the particular embodiment shown in FIG. 7, portion 31 of shank 30 is threaded so as to fit into, and be threadably fastenable into, opening 82 of workpiece 80)).

Figure 8:
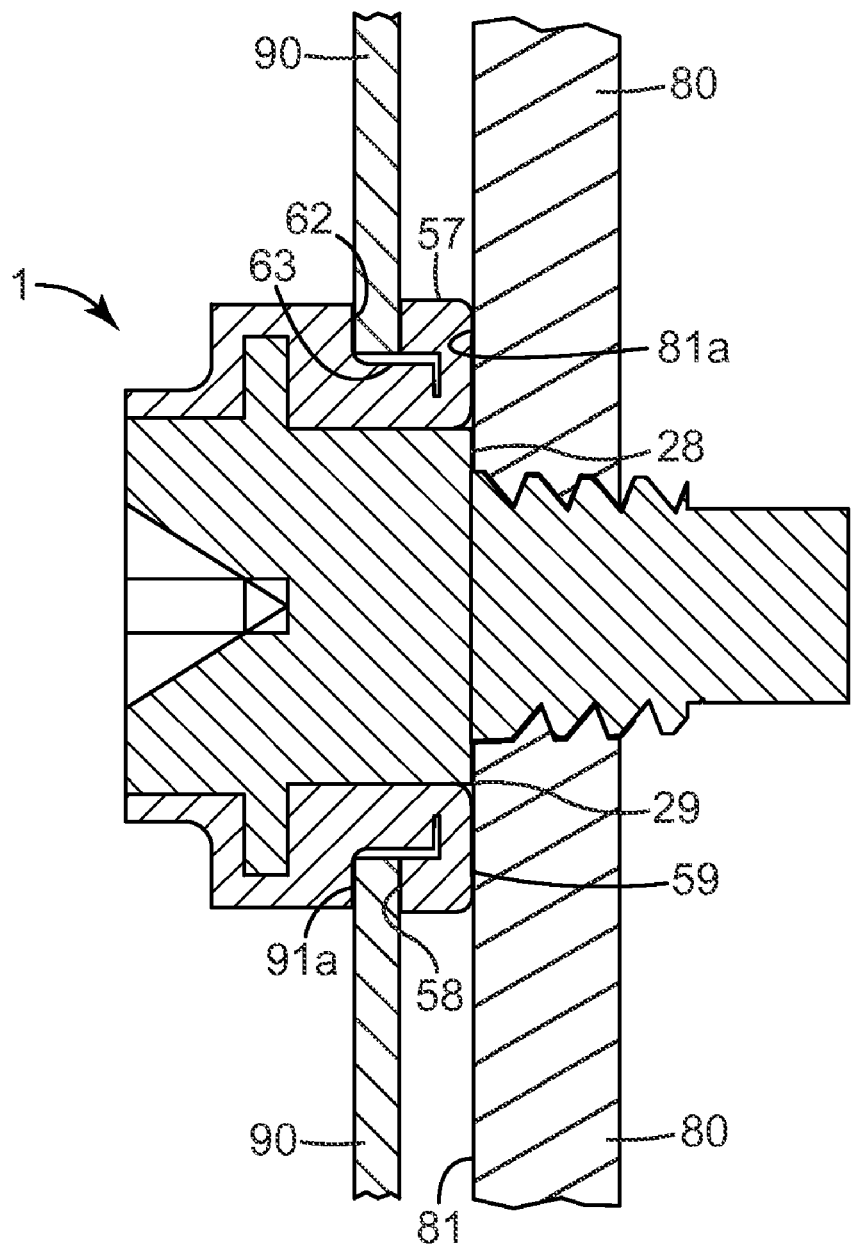
FIG. 8 is a side cross sectional view of two workpieces fastened together by the fastening assembly of FIG. 1.

To facilitate the bringing of tab surfaces 57 into contact with first workpiece 80, the above-mentioned diameter D2 defined by the outer surfaces 58 of tab heads 66 is chosen so that surfaces 57 of tab heads 66 contact surface 81 of workpiece 80 in area 81a that is adjacent to, and radially outward from, opening 82. Contact of tab surfaces 57 with first workpiece 80 results in force being applied to tab heads 66 by surface 81a of workpiece 80. Although such force is applied generally along the axial dimension of bushing 50, the "head and neck" design of tabs 55 provides that such force causes tab heads 66 to be deflected radially outward from their original, axially extended position (e.g., the position shown in FIG. 7) by way of bending of at least tab neck 70 of tabs 55. Continuation of this process (i.e., by the act of fastening fastener 20 to first workpiece 80, e.g. by threadably engaging portion 31 of fastener 20 farther into opening 82 of workpiece 80) results in tabs 55 being curled into a partially curled position in which process tab heads 66 are motivated axially toward bushing head 52. As a result, a surface (e.g., surface 58) of tab head 66 will contact second major surface 94 of second workpiece 90 and will urge workpiece 90 along the axial dimension of fastener 20 toward enlarged head 52 of bushing 50, such that first major surface 91 of workpiece 90 contacts enlarged head 52 of bushing 50. Accordingly, second workpiece 90 will then be pinned between a surface of enlarged head 52 of bushing 50, and a surface (e.g., surface 58) of tab head 66, as shown in FIG. 8. Thus, second workpiece 90 may be securely held in place, without any portion of workpiece 90 coming into contact with any portion of first workpiece 80 or with any portion of rigid fastener 20.

Those of ordinary skill will recognize that rigid flange 23 of rigid fastener 20 may serve (in addition to the above-mentioned enhancing of the integrally securing of bushing 50 to fastener 20) to enhance the holding of workpiece 90 securely in place, while vibration-isolation is provided by way of rigid flange 23 being isolated beneath a layer of elastomeric material of bushing 50. Those of skill in the art will additionally note that the radially outward deflection of tab heads 66, and the partial curling of tabs 55 so as to urge workpiece 90 toward bushing head 52 and to hold workpiece 90 securely between a surface of the tab heads and a surface of the bushing head, is accomplished herein without the use of any type of rigid sleeve to initiate and/or assist the deflecting/curling process.

In order for second workpiece 90 to be pinned against a surface of enlarged head 52 of bushing 50, fastening assembly 1 may be designed such that largest diameter D1 of enlarged head 52 of bushing 50 is larger than diameter D4 of opening 92 of second workpiece 90. Such an arrangement provides that surface 91a of workpiece 90, being radially outwardly adjacent to opening 92, will be able contact some portion of bushing head 52. In some embodiments, such contact of surface 91a of workpiece may be with axial-facing surface 54 of bushing head 52. In other embodiments, the above-described plurality of resilient projections may be provided from bushing head 52 such that the contact occurs with a surface of at least some of the projections. The use of such projections may provide increased compliance of bushing head 52, and/or increased range of motion of workpiece surface 91a relative to bushing head 52, and thus may allow fastening assembly 1 to be used with workpieces 90 of various thicknesses. In specific embodiments, the plurality of projections comprise a plurality of ribs, with surface 91a of second workpiece 90 being securely held between surface 58 of bushing tab heads 66 and surface 62 of ribs 60A, as shown in FIG. 8. When workpiece 90 is so held, radially inwardly facing surface 93 of opening 92 of second workpiece 90 may or may not come into contact with outer surface 64 of main body 51 of bushing 50, and/or with surface 63 of ribs 60B of bushing 50.

When workpieces 80 and 90 are securely fastened together by the methods disclosed herein, they may remain separated at least by a distance corresponding generally to radial thickness L1 of tab heads 66. Accordingly, radial thickness L1 of tab heads 66 may be chosen to advantage, e.g. relative to the dimensions of other components of bushing 50. The relationship of the radial thickness of tab heads 66 to the radial thickness of tab neck 70 has already been discussed above. In addition, radial thickness L1 of tab heads 66 may be chosen to be at least about 110%, at least about 120%, or at least about 130%, of the axial extent (length) L5 of tab neck 70. (Tab heads 66 may of course be slightly compressed when workpieces 80 and 90 are secured together, as discussed in further detail later herein. Numerical relationships disclosed herein are with reference to bushing 50 in an undeflected, uncompressed state, e.g. as shown in FIG. 5).

The axial distance L2 between the axially outermost surface of any projection from bushing head 52 (e.g., from surface 54 of bushing head 52, in the case that no projections are present, or from surface 62 of rib 60A, if such ribs are present), and the junction of tab neck 70 with main body 51 of bushing 50, may also be chosen to advantage. Specifically, such distance should be sufficient to accommodate thickness L3 of second workpiece 90 while allowing sufficient room for tab 55 to bend at tab neck 70. In various embodiments, distance L2 may range from about 0.5 mm to about 1.5 mm. In additional embodiments, distance L2 may range from about 70% to about 130% of thickness L3 of workpiece 90.

The above-discussed parameters may be chosen in combination such that in the attaching of workpieces 80 and 90 together, an optimum amount of (axial) compression of certain components of elastomeric bushing 50 may be easily obtained. Such an optimum amount of compression may be high enough that workpiece 90 is held sufficiently tightly, while not being so high that the vibration-damping properties of the elastomeric material of tab head 66 (and/or other components of bushing 50) are adversely affected. An advantage of at least some embodiments disclosed herein is that this optimum amount of compression may be obtained "automatically" when axial face 28 of head 22 of fastener 20 is brought into contact with surface 81a of workpiece 80 (i.e., at the "hard-stop" point when little or no further insertion of fastener 20 into opening 82 of workpiece 80 is possible). This may minimize or eliminate any uncertainty on the part of the user of fastening assembly 1 as to whether a particular degree of insertion of fastener 20 into opening 82 of workpiece 80 is sufficient.

This may be achieved e.g. by choosing the axial distance L6 from the axially-facing surface of bushing head 52 (against which surface 91 of workpiece 90 will abut), to surface 28 of fastener head 22 (against which surface 81 of workpiece 90 will abut), in combination with tab head radial thickness L1 and the thickness of workpiece 90. That is, distance L6 (which in the exemplary embodiment of FIG. 7, will be the distance from surface 62 of ribs 60, to surface 28 of fastener head 22) may chosen such that when a workpiece 90 of a given thickness L3 occupies a portion of distance L6, the remaining portion of distance L6 available to be occupied by tab head 66 is slightly less than the (uncompressed) thickness L1 of tab heads 66. Thus to occupy this portion of distance L6, tab heads 66 must be slightly compressed.

In actuality, it is likely that both tab heads 66, and axially-facing portions of enlarged head 52 of bushing 50 (e.g., axially-facing ribs 60), may experience some axial compression. Thus, for ease of description, numerical values of compression as used herein are defined in terms of distance L2, which is the axial distance (with bushing 50 and tabs 55 thereof in an extended, uncompressed state) from the axially outermost surface of any projection from bushing head 52 (e.g., from surface 54 of bushing head 52, in the case that no projections are present, or from surface 62 of ribs 60, if such ribs are present), to the junction of tab neck 70 with main body 51 of bushing 50. When fastening assembly 1 is in the secured position shown in FIG. 8, some of distance L2 will be occupied by a portion of tab head 66 (typically such occupying portion will have a thickness about equal to tab head thickness L1 minus tab neck thickness L4), with the remaining portion of distance L2 being available for occupancy by thickness L3 of workpiece 90. Compression as used herein is defined as the ratio of the axial distance theoretically available for workpiece 90, as determined by the uncompressed dimensions of L2 and tabs 55, to the actual thickness of workpiece 90. Such compression thus may take into account compression of both tab heads 66 as well as that of e.g. ribs 60A. With compression defined in this manner, the inventor has found that a compression generally in the range of around 10% is suitable. In various embodiments, such compression may range from at least about 8% to at most about 12%. And, as discussed above, distance L6 may be chosen such that this compression is achieved at the hard stop of insertion of fastener 20 into workpiece 80.

By way of numerical example, a distance L2 of about 1.5 mm may be used. A tab head thickness L1 of thickness of 1.2 mm may be used, in combination with a tab neck thickness L4 of 0.6 mm. Thus, when fastening assembly is secured as shown in FIG. 8, distance L2 will be (partially) occupied by a portion of tab head 66 of about 0.6 mm in width (i.e., tab head thickness of 1.2 mm minus tab neck thickness of 0.6 mm). This leaves a space of 1.5 mm minus 0.6 mm, or about 0.9 mm, theoretically available to be occupied by workpiece 90. If workpiece 90 has an actual thickness of 1.0 mm, this would result in a compression of (1.0-0.9)/1.0, or about 10%, reflecting the fact that tab heads 66 and/or ribs 60 must undergo slight compression to accommodate the actual thickness of workpiece 90. These numbers of course are provided merely to provide a specific example; those of ordinary skill in the art will appreciate that the above-discussed parameters can be varied, e.g. in order to accommodate workpieces 90 of different thicknesses, and the like.

Workpieces 80 and 90 may comprise any workpieces which are desired to be secured to each other while providing at least some degree of vibration isolation therebetween. For example, workpiece 80 may comprise a component of, housing for, etc., a moving part (e.g., a rotating or reciprocating part), while workpiece 90 may be connected to (e.g., may be a housing for, etc.) a component which is desired to at least somewhat shield from vibration. Or, the reverse may be true. In particular embodiments, one workpiece may comprise a component of a cooling fan, with the other workpiece comprising a component of an electronic equipment to which the cooling fan is desired to be attached in a manner so as to provide vibration isolation. Multiple fastening assemblies 1 (e.g., 2, 3, 4 or more) may be used, as desired.

Opening 92 in second workpiece 90 may be a through-hole, such that shank 30 and tab heads 66 may penetrate therethrough, as described above. Opening 82 in first workpiece 80 may be a through-hole or a dead-end hole. In the particular embodiment shown in FIG. 7, opening 82 is a threaded through-hole. (While in the exemplary embodiment of FIGS. 7 and 8, workpiece 80 is shown as having a threaded opening 82, threaded portion 31 of fastener 20 may comprise self-tapping ability so that opening 82 in workpiece 80 may not necessarily require threads). In such embodiments, shank 30 of fastener 20 may comprise an unthreaded terminal portion 33 which comprises a diameter that is smaller than that of threaded portion 31. Such a feature may be useful in allowing threaded portion 31 of shank 30 to more easily be piloted into a threaded opening in a workpiece.

EXAMPLES

Rigid metal fasteners of the type generally described in FIGS. 3 and 4 were made via metal-forming methods well known in the art. The fasteners had an overall axial length of approximately 13.3 mm, including an enlarged head of length approximately 6.2 mm and a shank of length approximately 7.1 mm. The enlarged head had a diameter of approximately 6.5 mm and comprised a continuous annular disc that protruded radially outward from the enlarged head and that had an outer diameter of approximately 10 mm and an axial thickness of approximately 0.7 mm. An open-ended cavity adapted to receive a star-point bit was present at the terminal end of the enlarged head. The shank included a threaded portion (of axial length of approximately 4.2 mm) with self-tapping threads, with an unthreaded portion (of slightly smaller diameter than the threaded portion) of axial length approximately 3.0 mm being present at the terminal end of the shank.

A molding cavity was provided which was shaped to form a bushing of the general design shown in FIG. 5. An above-described metal fastener was placed into the molding cavity and a molten thermoplastic elastomer molding resin was injected into the cavity so as to flow over the outer surfaces of the enlarged head and annular disc protruding radially therefrom. The molding resin was allowed to cool and the finished part was removed from the molding cavity. Samples were made using two different molding resins (those available from Aearo E-A-R division of 3M Company (St. Paul, Minn.) under the trade designations ISODAMP C-1002 and ISODAMP C-8002.

By this process, fastening assemblies of the general design shown in FIGS. 1 and 2 were provided. The elastomeric bushing and the metal fastener were found to be integrally secured to each other and could not be easily separated without destroying the bushing. The bushing comprised a largest diameter (of the enlarged head of the bushing that circumferentially surrounded the annular disc of the fastener) of approximately 11.2 mm. The diameter of the interrupted annulus defined by the radially outermost surfaces of the bushing tabs was approximately 9.0 mm. The radial thickness of the tab subheads was approximately 1.2 mm with the radial thickness of the tab necks being approximately 0.6 mm. The radial thickness of the axially oriented ribs was approximately 0.6 mm.

When used to secure first and second workpieces (metal panels with appropriately sized openings therein) together, it was found that the process of threadably securing the fastener to the first workpiece caused the tab heads to deflect radially outward and the tabs to partially curl axially toward the enlarged head of the bushing, thus causing the second workpiece to be securely held between surfaces of the tab heads and surfaces of the bushing head ribs, in similar manner as explained earlier herein. Threadably engaging the fastener to the point that the axial-facing surface of the enlarged head of the fastener reached a hard stop against the surface of the workpiece to which the fastener was threadably attached, appeared to provide compression (as defined herein) in the desired range of around 10%.

The fasteners were also used in the above-described manner to attach a cooling fan of the type conventionally found in personal desktop computers, to the rear metal panel of the housing of a typical computer. To do this, the fan (in a conventional fan housing) was positioned inside the computer housing, and the fastening assembly was passed partially through a through-hole in the rear metal panel of the computer housing and the metal fastener was piloted into a threaded bore of the fan housing. The fastener was threadably engaged with the threaded bore of the fan housing, resulting in the portion of the metal panel of the computer housing immediately radially outwardly adjacent the through-hole being securely held between the tab heads and bushing head ribs of the elastomeric bushing, until a hard stop was reached. Four such fastening assemblies were mounted in four aligned holes in the fan housing and computer housing, thus resulting in the secure attachment of the cooling fan within the computer housing.

An accelerometer was mounted on a metal side panel of the computer housing, a few inches from the fan. The fan was operated at approximately 8 V, which corresponded to a fan RPM of approximately 3000 (the area of the computer rear panel against which the fan was mounted was perforated to allow air flow, as is typically done). The accelerometer was used to measure the vibration of the computer side panel, with results being reported in G (gravity) level. Results were recorded in a frequency range of from 20 Hz to 1500 Hz.

In Table 1 is reported the G level at the two ("peak") frequencies which exhibited the highest G level. The table presents data for fans attached to the computer housing by use of fastening assemblies comprising an elastomeric bushing as described herein, in comparison to fans attached by use of conventional rigid metal fastening screws. A significant reduction in vibration of the side panel of the computer housing is seen to occur when the fan is mounted via a fastening assembly comprising the herein-described elastomeric bushing.

TABLE 1

| Mounting Method | First Peak | | Second Peak | |
| --- | --- | --- | --- | --- |
| | Frequency (Hz) | G level | Frequency (Hz) | G level |
| Fastener with Bushing (C1002) | 209 | 0.014 | 500 | 0.015 |
| Fastener with Bushing (C1002) | 220 | 0.014 | 492 | 0.013 |
| Fastener with Bushing (C8002) | 215 | 0.012 | 479 | 0.012 |
| Metal Fastening Screw | 228 | 0.027 | 452 | 0.022 |

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures.

What is claimed is:

1. A fastening assembly for securing together first and second workpieces while maintaining vibration-isolation between the workpieces, comprising:
   an axially elongated, rigid fastener comprising a radially enlarged head that comprises a flange extending radially outward therefrom and a shank extending axially therefrom, wherein at least a portion of the shank comprises a fastening means;
   an elastomeric bushing that circumferentially surrounds at least a portion of the elongated fastener and that has a cylindrical axis that is generally aligned with the long axis of the elongated fastener, the bushing comprising a radially enlarged head that at least partially encapsulates the flange of the fastener head with a cavity having generally the same shape as the flange so as to integrally secure the bushing and the fastener together;
      wherein the bushing includes at least two axially-extending, circumferentially-spaced, deflectable tabs, each tab comprising a tab head at a terminal end of the tab and a tab neck that is substantially radially thinner than the tab head and that is axially located between the tab head and the enlarged head of the bushing;
      and wherein by bending at the tab neck, each tab can be deflected at least from a first, axially extended position to a second, partially curled position in which the tab head is motivated axially toward the radially enlarged head of the bushing.

2. The fastening assembly of claim 1 wherein the fastening assembly is adapted for securing together first and second workpieces with openings therein, wherein the fastening means of the elongated fastener is adapted to fasten to the first workpiece, and wherein the fastening assembly is further adapted so that when a portion of the shank of the elongated fastener is passed through the opening in the second workpiece and the fastening means of the elongated fastener is fastened to the first workpiece, the terminal end of each tab contacts a surface of the first workpiece causing each tab to bend at the tab neck causing each tab to be deflected from the first, axially extended position to the second, partially curled position in which the tab head is motivated axially toward the radially enlarged head of the bushing, thus causing the second workpiece to be securely held between the tab heads of the bushing and the radially enlarged head of the bushing.

3. The fastening assembly of claim 1 wherein the radially enlarged head of the bushing comprises a plurality of compliant projections that protrude axially from the radially enlarged head of the bushing toward the terminal ends of the bushing tabs, such that when the fastening means of the elongated fastener is fastened to the first workpiece, the second workpiece is securely held between the tab heads of the bushing tabs and the compliant projections of the bushing head.

4. The fastening assembly of claim 3 wherein the plurality of compliant projections is a plurality of axially protruding, radially extending, circumferentially spaced ribs.

5. The fastening assembly of claim 1 wherein the bushing further comprises a plurality of radially protruding, axially extending, circumferentially spaced ribs.

6. The fastening assembly of claim 1 wherein the tab neck of each bushing tab comprises an axial length, and wherein at least one bushing tab comprises a tab head with a radial thickness that is at least 110% of the axial length of the tab neck of the at least one bushing tab.

7. The fastening assembly of claim 1 wherein at least one of the tab heads of the bushing comprises two tab subheads circumferentially connected by a tab portion that is substantially radially thinner than the tab subheads.

8. The fastening assembly of claim 7 wherein the bushing further comprises a plurality of radially protruding, axially extending, circumferentially spaced ribs and wherein at least one of the radially protruding, axially extending, circumferentially spaced ribs is circumferentially aligned with a tab subhead.

9. The fastening assembly of claim 8 wherein the at least one rib comprises a radial thickness that is substantially equal to the radial thickness of the tab subhead with which it is circumferentially aligned.

10. The fastening assembly of claim 1 wherein the radially enlarged head and the shank of the elongated fastener, and the radially enlarged head of the bushing, are cylindrical.

11. The fastening assembly of claim 10 wherein the tab heads of the bushing tabs define in combination a circumferentially interrupted annulus with an outer diameter defined in combination by the radially outermost surface of each of the tab heads, and wherein the fastening assembly is adapted for use with:
 a second workpiece with a generally circular opening that is larger in diameter than the outer diameter of the interrupted annulus defined by the tab heads of the bushing and that is smaller in diameter than the diameter of the radially enlarged head of the bushing; and,
 a first workpiece with a generally circular opening with a diameter large enough to receive at least a portion of the fastener shank but that is smaller than the outer diameter of the interrupted annulus defined by the tab heads of the bushing.

12. The fastening assembly of claim 11 wherein the fastener shank comprises a portion that is adapted to mate with the opening in the first workpiece, and wherein when the portion of the fastener shank is mated with the opening in the first workpiece and the fastening means of the fastener is fastened to the first workpiece, the terminal end of each tab of the bushing contacts a surface of the first workpiece adjacent to the opening of the first workpiece causing each tab to bend at the tab neck.

13. The fastening assembly of claim 12 wherein the fastening means comprises a threaded portion of the fastener shank and wherein the opening of the first workpiece is adapted to threadably receive at least a portion of the threaded portion of the fastener shank.

14. The fastening assembly of claim 13 wherein the fastener shank further comprises an unthreaded terminal portion that is distal to the fastener head and that comprises a smaller diameter than the threaded portion of the shank.

15. The fastening assembly of claim 1 wherein the fastener head comprises an open-ended cavity for receiving a bit.

16. The fastening assembly of claim 1 wherein the fastener head comprises a cylinder with first and second axial ends and with the fastener shank extending from the second axial end of the fastener head, and wherein the first axial end of the fastener head comprises a shaped portion that is adapted to be gripped by a gripping tool.

17. The fastening assembly of claim 1 wherein a shoulder of the elongated fastener that is defined by the junction of the radially enlarged fastener head and the shank extending axially therefrom, is generally axially aligned within an axial extent of a tab neck of a tab of the elastomeric bushing.

18. The fastening assembly of claim 1 wherein the radially outwardly extending flange of the fastener head is a circumferentially continuous annular disc, and wherein the radially enlarged head of the resilient bushing comprises an annular, inwardly facing groove within which the annular disc of the fastener head is held.

19. The fastening assembly of claim 1 wherein the elastomeric bushing is formed by overmolding a molding resin over portions of the elongated fastener so as to completely circumferentially surround at least some axial portions of the elongated fastener.

20. The fastening assembly of claim 1 wherein the radially enlarged head of the fastener comprises a cylinder with first and second axial ends and a radial outer surface and with the fastener shank extending from the second axial end of the fastener head, and wherein the radially enlarged head of the bushing comprises a cylindrical portion that completely circumferentially surrounds at least an axial portion of the radial outer surface of the fastener head and that axially terminates at the first axial end of the fastener head.

21. The fastening assembly of claim 1 wherein the fastening assembly does not comprise a rigid sleeve.

22. A method of securing first and second workpieces together in such a manner as to provide vibration isolation between the workpieces, the method comprising:
 providing first and second workpieces that are spaced apart from each other and that have aligned openings therein;
 providing a fastening assembly comprising:
  an axially elongated, rigid fastener comprising a radially enlarged head that comprises a flange extending radially outward therefrom and a shank extending axially therefrom, wherein at least a portion of the shank comprises a fastening means;
  an elastomeric bushing that circumferentially surrounds at least a portion of the elongated fastener and that has a cylindrical axis that is generally aligned with the long axis of the elongated fastener, the bushing comprising a radially enlarged head that at least partially encapsulates the flange of the fastener head with a cavity having generally the same shape as the flange so as to integrally secure the bushing and the fastener together;
  wherein the bushing includes at least two axially-extending, circumferentially-spaced, deflectable tabs, each tab comprising a tab head at a terminal end of the tab and a tab neck that is substantially radially thinner than the tab head and that is axially located between the tab head and the enlarged head of the bushing;
 passing at least the portion of the shank of the elongated fastener that comprises the fastening means, and at least the tab heads of the bushing, through an opening in the second workpiece;
 and,
 fastening the fastening means of the fastener shank to the first workpiece,
  thereby causing the two workpieces to be drawn nearer to each other and causing the terminal end of each bushing tab to contact a surface of the first workpiece adjacent the opening in the first workpiece thus causing each tab to bend at the tab neck causing each tab to be deflected from a first, axially extended position to a second, partially curled position in which the tab head is motivated axially toward the radially enlarged head of the bushing, and causing the second workpiece to be securely held between the tab heads of the bushing and the enlarged head of the bushing.

23. The method of claim 22 wherein the opening in the first workpiece is a generally circular through-hole or dead-end hole and wherein the opening of the second workpiece is a generally circular through-hole that is larger in diameter than the opening in the first workpiece.

24. The method of claim 23 wherein the fastening means of the fastener comprises a threaded portion of the shank that is threadably insertable into an opening in the first workpiece and wherein the tab heads of the bushing define in combination a circumferentially interrupted annulus with an outer diameter defined in combination by the radially outermost surface of each of the tab heads, the outer diameter being sized so that when the threaded portion of the fastener shank is threadably inserted into the opening in the first workpiece the terminal end of each tab contacts a surface of the first workpiece located radially outward of opening in the first workpiece.

25. The method of claim 24 wherein the radially enlarged head of the fastener comprises an axially-facing surface that faces toward the fastener shank, and wherein the method comprises the step of threadably inserting the threaded portion of the fastener shank into the opening in the first workpiece such that the axial-facing surface of the enlarged head of the fastener is in contact with a surface of the first workpiece.

26. The method of claim 25 wherein when the axial-facing surface of the enlarged head of the fastener is in contact with a surface of the first workpiece, a compression of from at least about 8% to at most about 12% is achieved.

27. The method of claim 22 wherein when the first and second workpieces are secured together, at least some of the tab heads are positioned between at least a portion of a surface of the first workpiece and a portion of a surface of the second workpiece, so that the first and second workpieces are not in direct contact with each other.

28. The method of claim 22 wherein one of the workpieces comprises a panel of an electronic apparatus and wherein the other workpiece comprises a panel of a potentially vibration-emitting device.

29. The method of claim 28 wherein the electronic apparatus comprises a computer or a projector and wherein the potentially vibration-emitting device comprises a ventilation fan.

* * * * *